July 19, 1960 C. K. HOWEY ET AL 2,945,401
MACHINE TOOL
Filed April 1, 1959 5 Sheets-Sheet 1

INVENTORS,
CHARLES K. HOWEY,
REID L. WATTS

BY *Earnest F. Oberlin*

AGENT

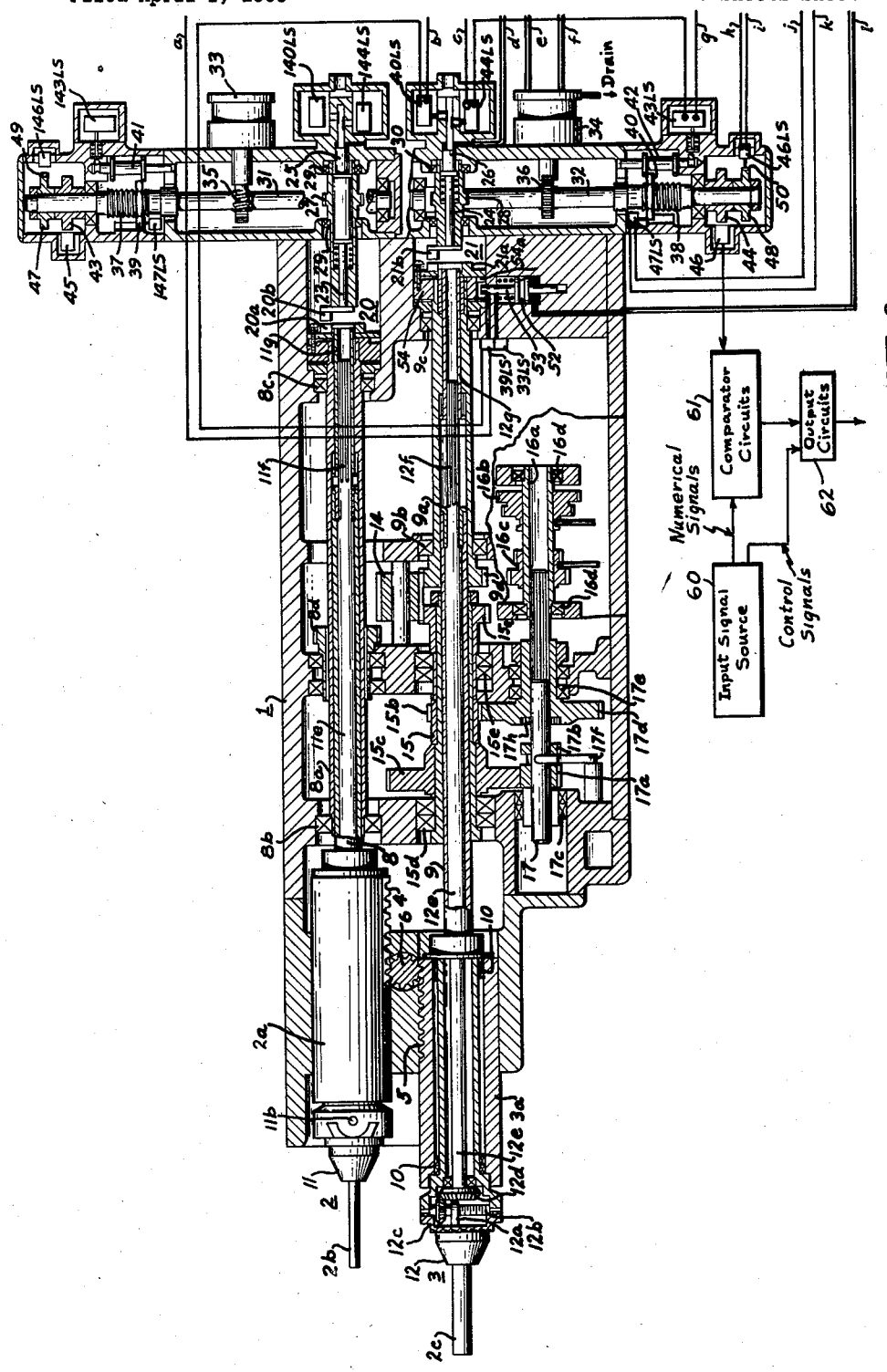

July 19, 1960
C. K. HOWEY ET AL
2,945,401
MACHINE TOOL
Filed April 1, 1959
5 Sheets-Sheet 5
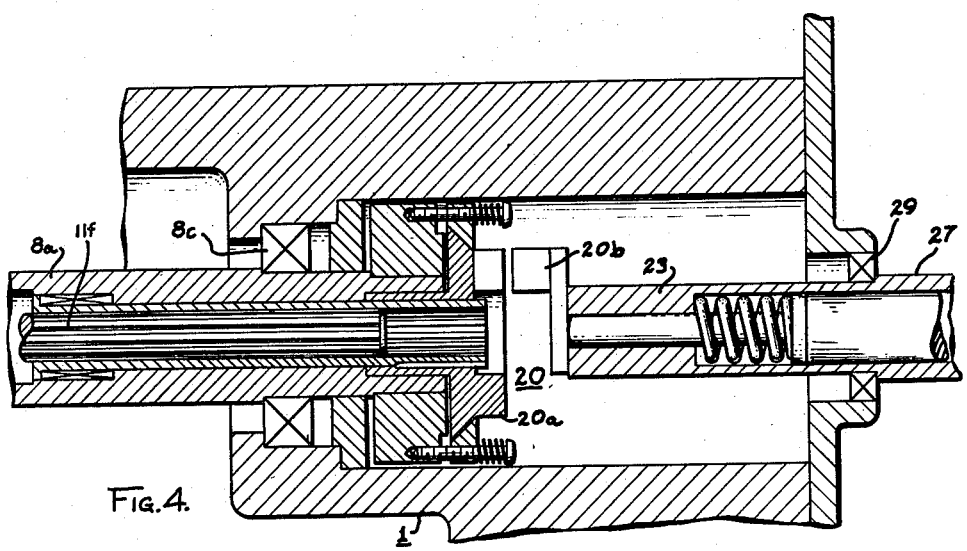
FIG. 4.
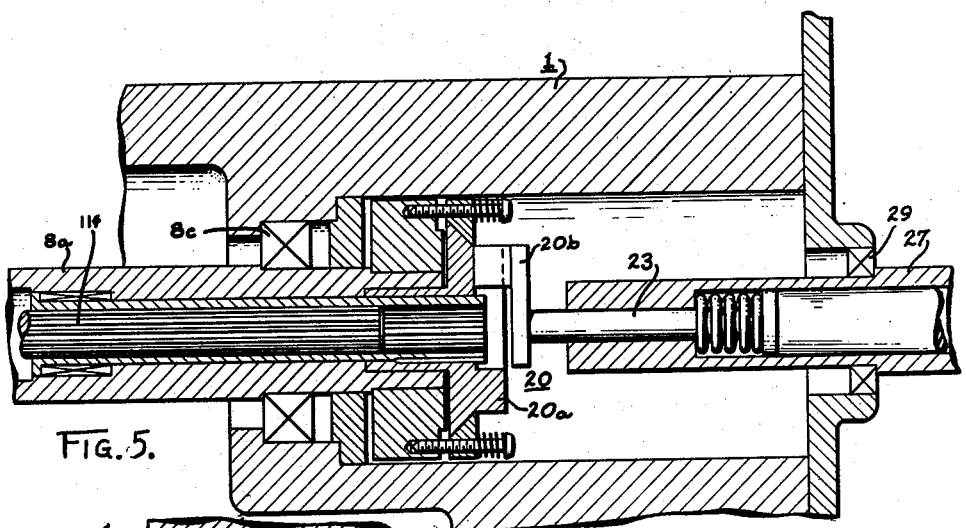
FIG. 5.
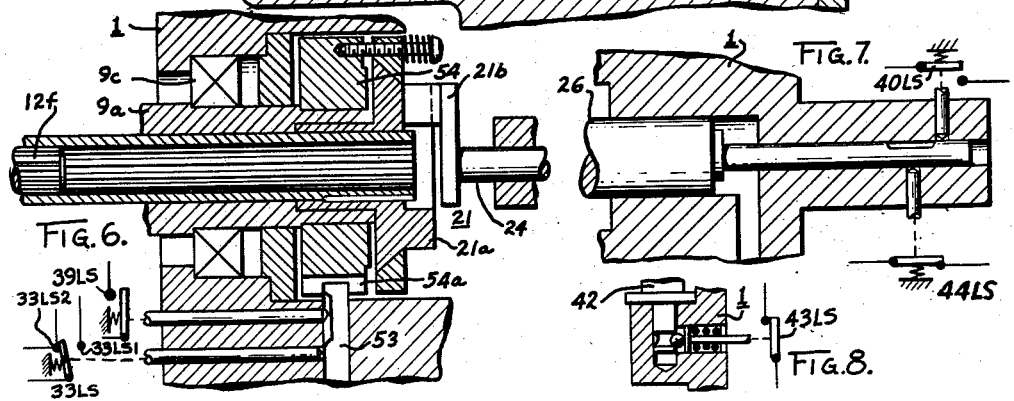
FIG. 6.
FIG. 7.
FIG. 8.

United States Patent Office 2,945,401
Patented July 19, 1960

2,945,401

MACHINE TOOL

Charles K. Howey, Torrance, and Reid L. Watts, Los Angeles, Calif., assignors to Hughes Aircraft Company, Culver City, Calif., a corporation of Delaware Filed Apr. 1, 1959, Ser. No. 803,496

10 Claims. (Cl. 77—3)

This invention relates generally to machine tools and more particularly to machine tools wherein operations are automatically controlled.

By way of example, this invention is described in connection with a boring tool but is applicable to other types of tools or mechanical devices wherein adjustment of one member relative to another member is required.

The machine tool herein described is particularly useful in a line of machine tools, or, as a single machine tool, controlled by a numerical program. An arrangement of this type is described in a copending application of T. T. Kumagai et al., Serial No. 827,981 filed March 30, 1959, entitled Machine Tool and assigned to the assignee of this invention. In such a machine tool line, the machine operation for a particular part is punched as a numerical code, for instance, a binary decimal code. These instructions are read by a suitable reading device providing discrete electrical signals which are applied as input to a suitable electrical control system for the machine tool. In the instructions to the boring machine, the instructions would include information selecting a particular one of two or more boring tool spindles, instructions for the radial setting of a selected boring tool, instructions concerning depth of feed and feed rates, etc.

Where such adjustments are to be made automatically, suitable mechanical provisions must be made in the organization of the tool whereby motors, either hydraulic or electric, under the control of the program may provide the type of operation described above.

Where such adjustments are to be made manually, provisions are made in the automatic circuits for inserting manually initiated signals from suitable manually controlled switch stations to effect a control of the type described above.

Accordingly, it is an object of this invention to provide a machine tool of the character referred to which is simple with respect to operational requirements and reliable in operation.

Another object of this invention is to provide a machine tool in which adjustments may be made automatically.

A further object of this invention is to provide a machine tool which may be operated by a suitable numerical type of program.

A more specific object of this invention is to provide a boring tool having provisions for adjusting the radial setting of the boring tool.

Further to the preceding object, it is an object hereof to provide a boring tool in which the radial setting of the boring tool may be remotely controlled.

Still further, it is an object hereof to provide a boring tool of the character referred to in the preceding object wherein all radial adjustments of the boring tool are sensed by an incremental position transducer.

The objects and advantages outlined hereinabove are achieved in one practical embodiment of this invention represented in a boring tool which comprises a pair of mechanically interlocked boring tool spindles which may be selectively extended and retracted, the mechanical interlocking preventing both from being extended or retracted simultaneously. The two spindles are mounted for rotation in a machine housing in substantially parallel relationship and a gear shift arrangement controlled by the spindle interlock connects the extended spindle to a power gearing arrangement. An index mechanism at each spindle is provided so that the spindle may be held in a fixed angular position when a radial setting of the boring tool thereat is to be made. To this end each spindle terminates in a carriage mounted boring head providing displacement of the boring head radially of the spindle.

Radial adjustment of each boring head is provided by a gear driven lead screw. The separate lead screw drives each include a splined, telescoping shaft assembly coaxially disposed of the associated spindle and having one telescoping section axially fixed. The axially fixed section terminates in a clutch member, slidably, frictionally coupled to the associated spindle shaft, and forming part of a single position, normally disengaged clutch which is engaged only after spindle indexing has taken place. The input member of this clutch, in an automatic mode of operation, is powered by a numerically programmed servo system including a feed-back loop fed by an incremental position transduced system responsive to boring head radial displacement. In a second mode of operation the servo system may be operated by manually controlled circuits.

For a better understanding of the invention together with other and further objects hereof, reference is made to the following description taken in conjunction with the accompanying drawings, given by way of example wherein.

Figure 3B:
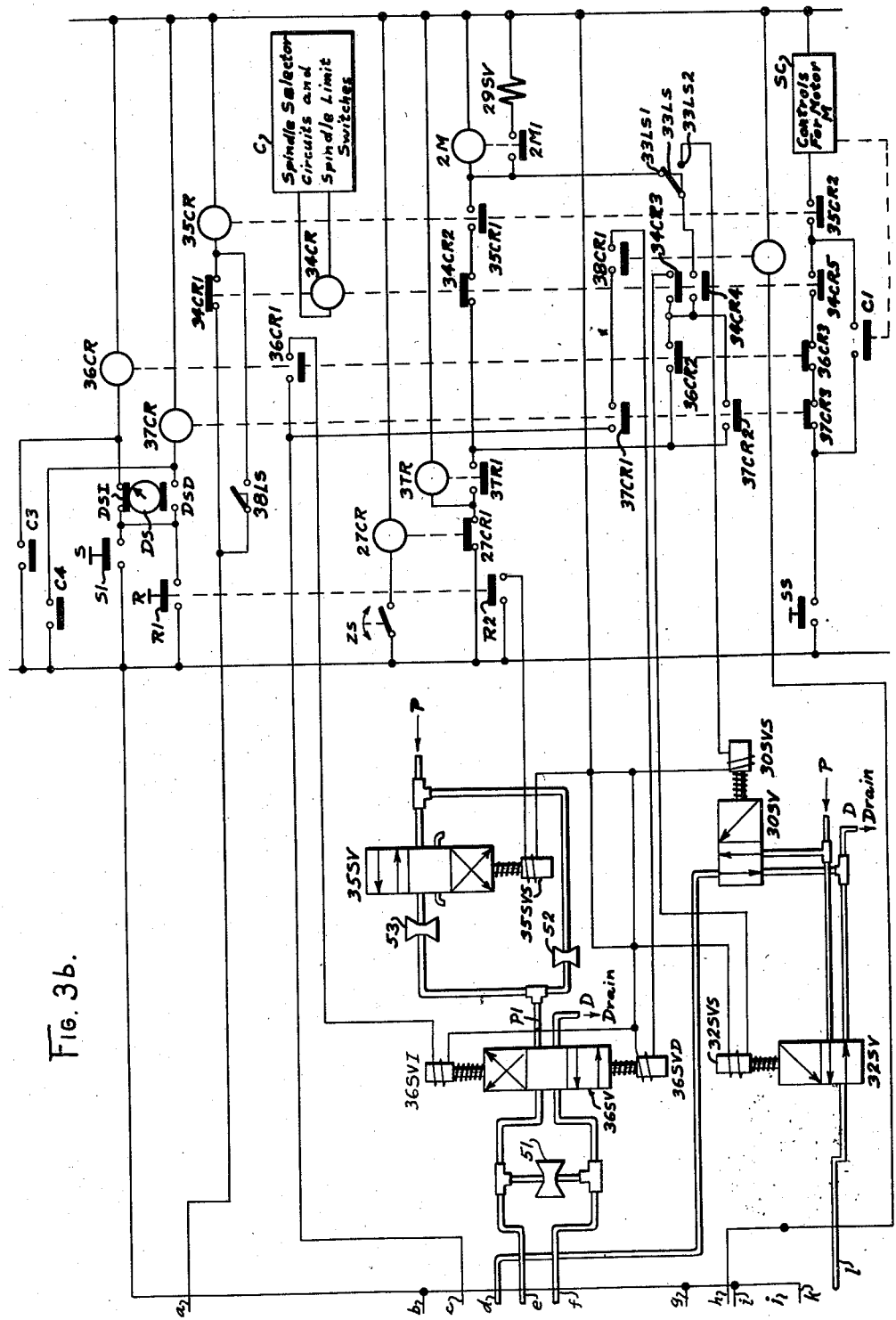

Figs. 3a and 3b together schematically illustrate an automatic boring tool system;

Fig. 4 is an enlarged detail of the single position servo clutch showing the clutch in disengaged position;

Fig. 5 is a view similar to Fig. 4 showing the single position servo clutch in an engaged position; and Figs. 6, 7 and 8 are enlarged details of the machine showing operation of certain limit switches.

With reference to the accompanying drawings the mechanical arrangement of the boring tool will be first described.

Figure 1:
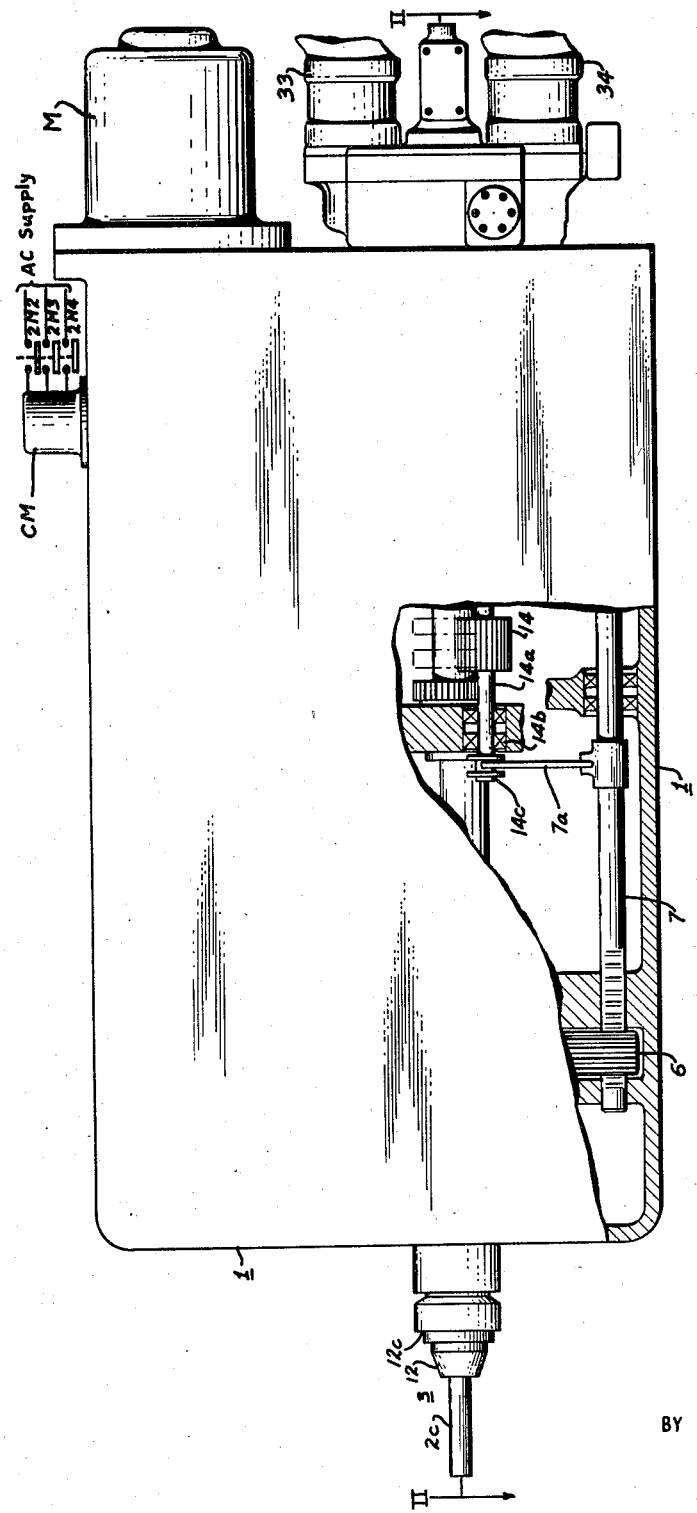
Fig. 1 is a side elevational view of a boring machine embodying the principles of this invention, with part broken away to show certain mechanical details.
Figure 2:
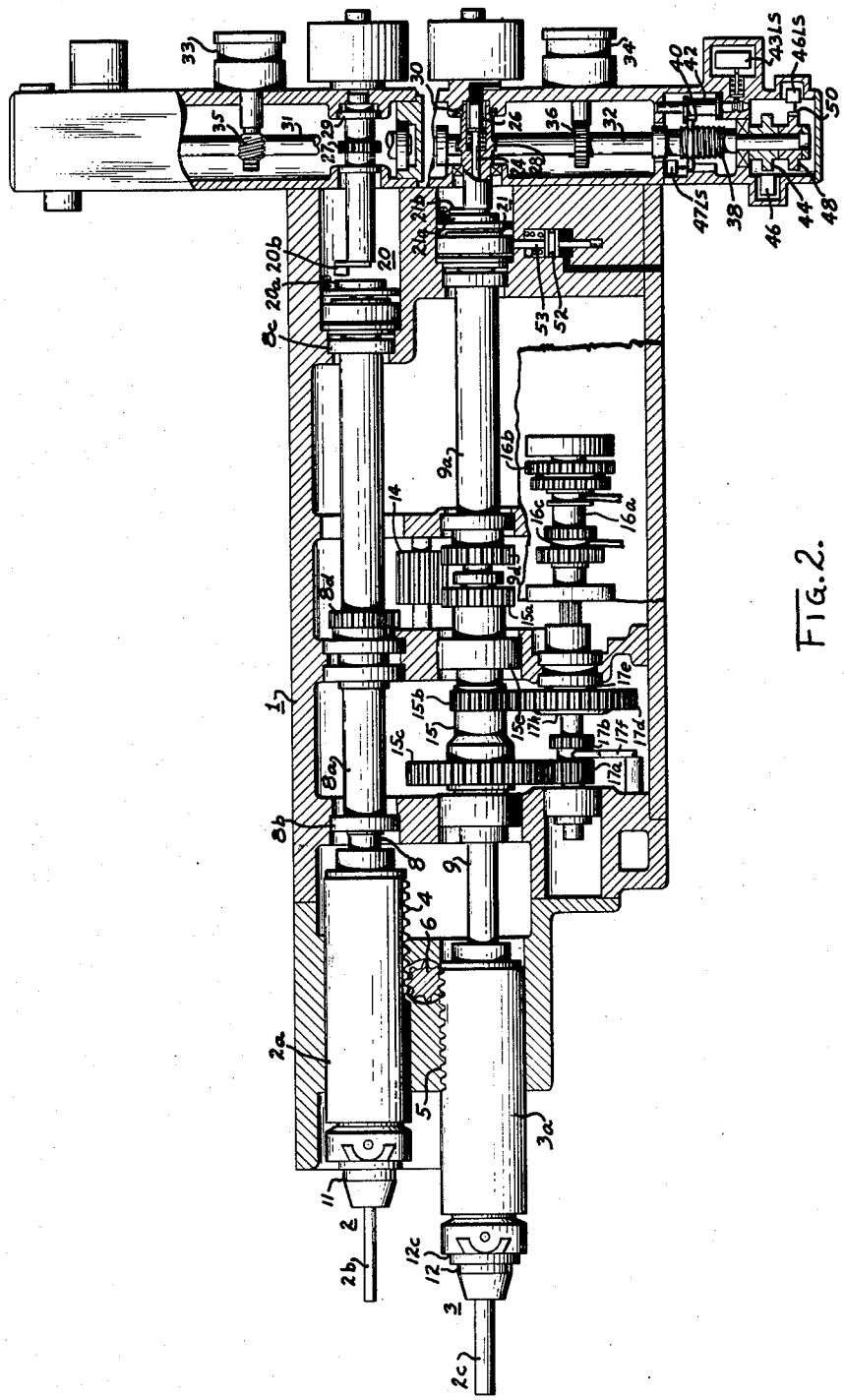
Fig. 2 is a sectional view taken on the line 2—2 of Fig. 1.

In Figs. 1, 2 and 3a the boring tool comprises a main housing generally designated 1, only those portions of the main housing believed necessary to an understanding of this invention are herein illustrated. This housing, it will be understood, is normally mounted on a machine framework provided with suitable ways or slides which may, for instance, provide three degrees of translational freedom about orthogonally related axis so that the housing 1 may be positioned with the axis of a selected boring tool at a particular point adjacent a workpiece.

As seen in Figs. 2 and 3a, the boring tool includes parallel spindle assemblies 2 and 3 which are rotatably mounted in quills 2a and 3a in housing 1. Quills 2a and 3a are slidably fitted in housing 1 and keyed against rotation. Each quill is provided with gear teeth forming respective quill racks 4 and 5, arranged in confronting relationship. The racks 4 and 5 are engaged by a single pinion 6, arranged therebetween. As will be seen by reference to Fig. 1, pinion 6 is driven by a rack 7 which is axially displaceable within the housing 1 to rotate the pinion 6. With reference to Fig. 3a, if the rack 7 is displaced from left to right, clockwise rotation of pinion 6 results which positions the respective quill assemblies in their respective extremes of axial positions, in which, spindle assembly 2 is fully retracted and spindle 3 is fully extended.

Tubular spindle shafts 8 and 9, respectively, forming part of spindle assembles 2 and 3, are rotatably mounted in bearings 10 in quills 2a and 3a, respectively. Both spindle shafts, on their left ends as viewed, slidably mount boring head carriages 11 and 12, respectively in dovetail slots, in positions providing radial displacement of the boring head carriages. Each carriage includes a chuck receiving a boring bar or cutter. These cutters are designated 2b and 2c. The drives for the boring head carriages are the same. The details of the drive for carriage 12 applies to carriage 11 also.

A nut 12a which is secured to the boring head carriage 12 is in threaded engagement with a lead screw 12b. Lead screw 12b is rotatably mounted in bearings for rotation about an axis paralleling the axis of the dovetail slots and at right angles to the spindle shaft axis. Lead screw 12b mounts a bevel gear 12c, in turn engaged by a bevel gear 12d mounted on the end of an adjustment shaft 12e which is journaled within the tubular spindle shaft 9. Rotation of adjustment shaft 12e at times when the spindle shaft 9 is secured against rotation, therefore rotates the lead screw 12b. Rotation of lead screw 12b in one direction or the other correspondingly displaces the nut 12a and hence correspondingly displaces the boring head carriage 12 with respect to the axis of rotation of spindle shaft 9. By this expedient, radial adjustment of the boring head 12 is effected. Adjustment shaft 11e journaled within tubular spindle shaft 8 is similar to adjustment shaft 12e.

Each boring tool spindle shaft, 8 and 9, is slidably splined internally of a hollow power shaft. The power shafts are designated 8a and 9a, respectively. Power shaft 8a is journaled in bearings 8b and 8c and power shaft 9a is journaled in bearings 9b and 9c. Each power shaft mounts a suitable gear; these are respectively designated 8d and 9d. Gears 8d and 9d are selectively engaged by an idler pinion 14, which in the axial position shown, or, in a second axial position engaging gear 8d, continuously meshes with a power gear 15a forming part of jack shaft 15 including speed change gears 15b and 15c. This jack shaft is journaled about spindle shaft 9 in bearings 15d and 15e in housing 1.

The input to jack shaft 15 includes a jack shaft assembly 16 having a hollow internally splined shaft 16a and two slidably keyed gear clusters 16b and 16c thereon. Bearings 16d in housing 1 journal jack shaft assembly 16 in a position to slidably receive the external splines of a gear shift shaft 17 having an integrally formed pinion 17a and coupling dog 17b secured thereon. Gear shift shaft 17 is driven by jack shaft assembly 16 and is slidably journaled in bearings 17c and a gear 17d, the latter being journaled in bearings 17e in housing 1. A piston powered shift fork 17f having a forked extremity engaging a groove 17g between pinion 17a and coupling dog 17b, shifts gear shift shaft 17 between the position shown in which pinion 17a meshes with gear 15c, and a second position in which coupling dog 17b engages a recess 17h in gear 17d.

To effect shifting of idler gear 14 between positions in which either gear 8d or 9d is powered by gear 15a, idler gear 14 is secured to a shaft 14a which is rotatably and slidably journaled in bearings 14b, in housing 1, as seen in Fig. 1. The shift mechanism for idler gear 14 includes a shift lever 7a secured to and moved by the rack 7. Shift lever 7a is provided with a forked extremity which engages a suitable collar 14c on the end of shaft 14a. By this expedient, idler gear 14 may be displaced between a first position engaging power gear 15a with gear 9d, or, a second position engaging power gear 15a with gear 8d, to selectively power the extended boring tool spindle. Gear clusters (not shown) selectively engaged by gear clusters 16b or 16c, connect a motor M to the power gear train. A creep motor CM may also be connected to the power gear train by a suitable clutch (not shown).

As viewed, the right-hand ends of adjustment shafts 11e and 12e, respectively, terminate in splined sections 11f and 12f. These splined extremities stroke within respective internally splined sleeves 11g and 12g, which, in turn, respectively terminate in the output members, or, single position clutch plates 20a and 21a, better viewed in enlarged detail in Figs. 4 and 5, forming part of single position clutches 20 and 21, respectively. Cooperating single position input members, or, clutch dogs 20b and 21b are respectively coaxially disposed of the adjustment shafts 11e and 12e. These clutch dogs are connected to and driven by respective shafts 23 and 24, which are spring-loaded to the right, as viewed, and piston powered to the left by means of pistons 25 and 26, respectively, arranged in suitable cylinders in housing 1. The application of hydraulic fluid under pressure to either of these pistons at an appropriate time, displaces the associated clutch dog to the left as viewed to engage the coupling dog with the cooperating single position clutch plate. The way in which indexing of the clutch members is accomplished is explained at a later point. Clutch dogs 20b and 21b are slidably keyed against rotation within gears 27 and 28, respectively, which are rotatably journaled in respective bearing pairs 29 and 30. Gears 27 and 28 form part of respective right angle gear drives coupling the clutch dogs 20b and 21b to shafts 31 and 32, respectively. Shafts 31 and 32 are respectively driven by hydraulic motors 33 and 34, the output shaft of which are coupled through worm drives 35 and 36 to the respective shafts 31 and 32.

Each boring tool is provided with an incremental position transducer. To this end each of shafts 31 and 32 is provided with a threaded section 37 and 38, respectively. The thread pitch of each threaded section corresponds to the pitch of the threads on the associated boring head lead screw. Threaded portions 37 and 38 are respectively fitted with traveling nuts 39 and 40 which are suitably keyed in housing 1 to prevent rotation. Nuts 39 and 40, respectively, in the limits of their positions on the threaded shaft sections engage limit switch actuators 41 and 42 which actuate respective limit switches 143LS and 43LS. These switches when actuated in either of the extremes of positions of nuts 39 and 40, indicate the limits of adjustment.

Shafts 31 and 32 each carry drums 43 and 44 which are peripherally scribed (not shown) to provide peripheral scale divisions, each division indicating a predetermined increment of angular displacement. The lands and grooves formed in the peripheral surfaces of each of drums 43 and 44 are resolved by means of respective detector heads 45 and 46 which are disposed in flux linkage with the scribed surfaces of the respective drums. The drums are made of a suitable magnetic material and the heads are provided with cores and coils. The coil of each head is connected in a suitable circuit for energizing the heads and producing magnetic flux linking the drums. The magnetic reluctance of the magnetic circuit including the coil in the drum is thus varied as a land or a groove on the drum surface moves beneath the core of a detector head. Thus the impedance of the coil forming part of the head is varied between two extremes. By properly designing the head with a sufficiently small scale resolving pole face and by utilizing a suitable measuring circuit including the coil, the output of the measuring circuit may approximate a square wave as the head senses a land or a groove on the associated drum surface. Thus in effect a scale counter is provided which produces electrical signals indicative of increments of angular displacement. Details of such an incremental position transducer may be had by reference to a U.S. Patent No. 2,848,698 to C. K. Howey et al., entitled Variable Reluctance Electromagnetic Devices and assigned to the assignee of this invention.

Revolutions of each of shafts 31 and 32 are detected by respective limit switches 146LS and 46LS. These switches are actuated by circular cams 47 and 48, respectively, which are mounted on shafts 31 and 32 in positions axially displaced from drums 43 and 44. These cams are provided with single projections 49 and 50, respectively, which, once each revolution, actuate respective limit switches 146LS and 46LS. Thus, these limit switches count each revolution and, hence, indicate the advance of respective travelling nuts 39 and 40 one full thread pitch distance, to thereby count increments of radial displacement of the boring tool carriage assemblies. These limit switch signals in conjunction with the detector head signals thus provide coarse and vernier, or fine, indications of radial displacement of the respective boring tool carriages.

As noted earlier herein, only portions of the power gearing for the tool spindles has been shown herein. In practice the system has two modes of operation. In one mode, the normal cutting mode, the selected boring tool is driven by main motor M. When adjustments of the radial position of the selected cutting tool are to be made the main motor is de-energized and the system is driven by creep motor CM. The creep motor is connected into the system by a suitable friction clutch arrangement, not shown, at times when the power motor is de-energized and a cutter adjustment is to be made. Otherwise this clutch is not engaged and the creep motor is completely mechanically disconnected from the boring tool spindles when the boring tool is being driven by the main motor.

A simplified circuit arrangement including the hydraulic and electrical controls for controlling one of the boring tool spindles appears in Fig. 3b with suitable interconnections to the hydraulic and electrical devices associated with one of the tool spindles in Fig. 3a. The principles illustrated in this organization may be extended to include both of the spindles. This is simply accomplished in the hydraulic circuits with suitable parallel connections to corresponding valves associated with the second spindle. The circuit controls may be somewhat similarly extended but with suitable electrical interlocking to provide selectivity in spindle controls. Hence only essential circuit details are shown at this point for controlling one of the spindles.

Hydraulic motor 34 which provides input power for effecting radial adjustment of boring tool 2c, is a rotary type of hydraulic motor which is commercially available. It is provided with two hydraulic fluid connections here designated e and f which are selectively ported between hydraulic pressure and drain connections by means of a directional valve generally designated 36SV which is conventionally, symbolically shown. This valve is controlled by two spring-loaded solenoids designated 36SVI and 36SVD and may be of a conventional spool type which is spring-loaded to a centered position. The valve is provided with a single input fluid pressure connection designated P1 and a drain connection generally designated D. Hydraulic fluid is selectively ported and returned over fluid supply conductors e and f. If the boring diameter is to be increased, solenoid 36SVI is energized. If the boring diameter is to be decreased, solenoid 36SVD is energized. Leakage past valve 36SV, when the valve is de-energized, is ported to drain by means of an orifice type of bypass valve 51 which prevents inadvertent creeping of the hydraulic motor 34.

A second solenoid valve 32SV is controlled by a spring-loaded solenoid 32SVS. This valve controls the porting of hydraulic fluid under pressure to a piston 52 controlling a spring-retracted detent pin 53 which engages a notch in a ring 54 secured to power shaft 9a, the latter forming a part of the power drive for spindle 9. When valve 32SV is energized, fluid under pressure is ported to piston 52 which elevates the detent pin 53 to index the power shaft 9a and, hence, the spindle in an angular position determined by a recess 54a in ring 54. As will be explained at a later point in the description of the creep motor control circuits, the power shaft is slowly rotated by a creep motor CM during power shaft indexing. The end of detent pin 54a rides the peripheral surface of ring 54. Indexing is accomplished when the end of the detent pin engages and seats in the recess 54a. This angular position is fixed since only one recess is provided in ring 54. Porting of fluid to clutch piston 26 is controlled by a valve 30SV which is actuated by a spring-loaded solenoid 30SVS. Energization of this solenoid ports hydraulic fluid to clutch piston 26 to drive coupling dog 21b into engagement with the single position clutch plate 21a cooperating therewith. It will be recalled that clutch plate 21a is connected to adjustment shaft 12e and is also frictionally connected to power shaft 9a forming part of spindle 9. Since angular creeping of the coupling dog is prevented by bypass valve 51 and since clutch plate 21a is frictionally secured to power shaft 9a, both clutch members, at indexing of power shaft 9a are properly indexed. Such indexing is necessary for zeroing the cutter or for positioning the cutter to some new radial position. In each instance, the new dimension is preferably programmed from the last dimension. If the coupling dog has drifted from or must be moved to engage recess 54a the transducer reference, that is, the incremental position transducer reference is lost and the error in the new radial position will be equal to the incremental scale count due to the drift or repositioning prior to clutch engagement.

Another solenoid 35SV operates as a creep bypass valve. This valve is spring-loaded and solenoid-actuated by means of a solenoid 35SVS. When the valve is closed, that is, de-energized, hydraulic fluid under pressure is applied to the hydraulic circuit from a pressure input generally designated P and appears as input to the directional valve 36SV through a creep valve 52 which is a standard orifice valve, and, for the particular pressure applied to the hydraulic circuit, permits the application of fluid under pressure at a predetermined low volume rate, as input to the directional valve 36SV. The low volume rate of transfer of fluid to the hydraulic motor 34, assuming directional valve 36SV is energized, provides a creep mode of operation for radial adjustment of the boring tool. When valve 35SV is energized, hydraulic fluid under pressure is applied as input to the directional valve 36SV through a traverse valve 53 affording a higher rate of volume transfer to provide higher rate of operation of hydraulic motor 34 and, hence a higher rate of radial adjustment of the boring tool.

This control may be operated in either rapid or creep modes by suitable operation of respective slow or rapid switches, S and R, indicated in the circuit. As will be seen, if switch R is depressed, contacts R2 connect the coil of solenoid 35SVS directly across the power supply indicated by lines L1 and L2. When switch R is not actuated, the creep bypass valve 35SV remains de-energized.

The circuit illustrated provides selective control of rotation of hydraulic motor 34 by means of a manually adjusted directional switch DS having contacts DSI for increasing the bore diameter and contacts DSD for decreasing the bore diameter. When contacts DSI are closed, a circuit is partially completed for energizing bore diameter increase relay 36CR across the supply lines L1 and L2. This circuit is selectively completed by closing either contact S1 of the slow switch or contact R1 of the rapid switch R. Energization of relay 36CR closes contacts 36CR2 and 36CR1, to partially establish an energizing circuit for the coil of solenoid 36SVI, across the power supply, including additionally the series connected limit switch contacts 44LS and 43LS. Limit switch contacts 43LS (see Figs. 3a and 8) are normally closed whenever the boring tool servo is within its limits of radial adjustment, that is, when travelling nut 40 is within the limits imposed by the limit switch 43LS. Limit switch 44LS is closed only when the servo clutch coupling dog 21b is fully engaged with the single position clutch plate 21a. Thus, all the conditions for completing the drive to the boring head carriage 12 must be met before the solenoid 36SVI may be energized to port fluid to the hydraulic motor 34.

If the boring diameter is to be decreased, directional switch DS is moved to a position in which contacts DSD are closed. Thus assuming either slow contacts S1 are closed, or rapid contacts R1 are closed, a circuit is established across the power supply for energizing boring diameter decrease relay 37CR which closes contacts 37CR1. Contacts 37CR1 together with contacts 38CR1 of a spindle reference diameter relay 38CR parallel the contacts 36CR2 in a series circuit including the coil of solenoid 36SVD. Hence, limit switches 43LS and 44LS also control energization of this solenoid.

The spindle reference diameter relay 38CR is connected across the power supply in a circuit including a spindle reference diameter fine limit switch 46LS and a spindle reference diameter coarse limit switch 47LS in parallel therewith. The coarse reference diameter limit switch 47LS is actuated and opened by travelling nut 40 in that extreme position of the travelling nut indicating the boring tool is fully retracted, that is, at zero setting. This limit switch is therefore closed when the servo moves from the coarse zero setting. Limit switch 46LS opens once each revolution of cam 48. Consequently relay 38CR is energized if the radial setting is increased. When all of the series connected contacts, 43LS, 44LS, 37CR1 and 38CR1 are closed, solenoid 36SVD is energized and hydraulic fluid is ported to hydraulic motor 34 in such a sense that the radial displacement of the boring tool is decreased to reduce the boring diameter. This movement ceases if either switches S or R are opened, or, at such time as limit switches 46LS and 47LS de-energize relay 38CR.

As earlier explained herein, whenever a new adjustment is to be made on the radial setting of the boring tool, main motor M is de-energized and creep motor CM is energized. The controls for the complete operation are not shown; however, the control for starting the creep motor is indicated. This control includes a timing switch 3TR and a motor starter switch 2M which forms part of a control for energizing the creep motor CM. The creep motor starter 2M includes a contact 2M1 which may be used to enable energization of a solenoid 29SV, only the coil of which is shown, which is a solenoid valve used in the hydraulic circuit for selecting spindle speed. This forms part of a control for selecting the gear ranges, which is accomplished, in part, by moving shift fork 17f to the position shown in Fig. 3a, to be used in the creep mode of spindle operation, and, also forms part of a control for controlling the clutch (not shown) controlling connection of the creep motor in the power gear train. These details are not illustrated.

The motor starter switch 2M may also include three additional contacts, 2M2, 2M3 and 2M4 (see Fig. 1) each conventionally connected in one input line of the creep motor to effect energization of the creep motor. Contacts 3TR1 of a delayed drop-out timer relay 3TR, are normally open. Relay 3TR is connected in series with normally closed contacts 27CR1 of a zero speed relay 27CR energized by a zero speed switch ZS. Zero speed relay 27CR thus controls the creep motor starter switch 2M. The zero speed switch ZS is always closed whenever a spindle is rotating above creep speed.

The circuit for the creep motor switch 2M is further controlled by contacts 35CR1 of a relay 35CR which, when deenergized, indicates that the conditions for making an adjustment of the radial position of the selected spindle are established. Relay 35CR is connected across the power supply in a circuit including limit switch 40LS and limit switch 39LS in series. Limit switch 39LS is closed at any time that index or detent pin 53 is retracted and limit switch 40LS is closed when clutch dog 21b is retracted. Hence, in its energized condition relay 35CR may be used in control circuits for operating the main motor M.

In the circuit description to this point no reference has been made to relay 34CR. This relay has contacts 34CR1 to 34CR4, respectively, in series in circuits controlling relay 35CR, the creep motor 2M, the solenoid 32SVS and the solenoid 30SVS. Relay 34CR is an interlock in these circuits. It is controlled by spindle selector circuits and extend and retract spindle limit switches, not shown, but generally represented in block C. For the purpose of this discussion these circuits and the limit switches energize relay 34CR after a selected spindle is fully extended and normally maintain this relay energized until the cutter is fully adjusted.

Spindle pinning solenoid 32SV is controlled in a circuit across the power supply including contacts 27CR1 which are closed at spindle creep speed, contacts 3TR1 which are now closed and the coil of the solenoid 32SVS. Detent pin 53 is now fluid pressure biased against index ring 54. Since contacts 27CR1 and 3TR1 are now closed, a circuit for energizing motor 2M may be established. If it is desired to increase the bore diameter, switch DS is set, as shown, to close contacts DSI. Actuation of either of switches S or R energizes bore diameter increase relay 36CR closing contacts 36CR2. Since the boring spindle is not yet pinned or indexed, contacts 33LS1 of limit switch 33LS are closed. This completes the energizing circuit for the coil of the creep motor starter switch 2M. When the recess in indexing ring 54 coincides with the end of the detent pin 93 the pin is driven home and locks the spindle in that angular position. At this point contacts 33LS1 open, dropping out creep motor starter switch 2M and contacts 33LS2 close. This completes an energizing circuit across the power supply which includes contacts 27CR1, contacts 3TR1, contacts 36CR2, contact 33LS2 of the limit switch 33LS and the coil of solenoid 30SVS. Whenever the solenoid valve is energized, hydraulic fluid is ported to the piston 26 which drives clutch member 21b into engagement with the clutch plate 21a. Since clutch plate 21a is frictionally secured to power shaft 9a and since the dog on clutch member 21b occupies the same position it had when last disengaged from the recess in clutch plate 21a, the recess in clutch plate 21a at indexing or pinning of the power shaft, is aligned with the clutch dog, permitting full engagement of the servo clutch.

In the manually controlled mode of operation, when power is applied to supply lines L1 and L2, partial parallel circuits are established for energizing creep motor switch 2M. Prior to the time the selected spindle is fully extended relay 34CR is de-energized at this point, limit switches 39LS and 40LS are closed which with contacts 34CR1 energize relay 35CR. The first parallel circuit for energizing motor starter switch 2M thus includes contacts 27CR1, 3TR1, 34CR2 and 35CR1. This circuit is broken when the selected spindle is fully extended and relay 34CR is energized. The second parallel circuit is completed after relay 34 is energized and includes closed contacts 27CR1, the contacts 3TR1 of timing relay 3TR, contacts 36CR1 (for the indicated position of directional switch DS and answering one of switches S or R is closed) and contacts 33LS1, if the spindle is not indexed. Zero speed switch ZS remains open in creep speed operation and closes above creep speed. Motor CM rotates the spindle slowly. At this time the spindle pinning solenoid valve 32SV is energized in a circuit including contacts 27CR1, 3TR1 and 36CR2, and detent pin 53 is biased by hydraulic pressure against the surface of ring 54 on the selected spindle.

As ring 54 is slowly rotated by creep motor CM through the drive afforded by the power gear train including the gear 14 also in the position shown, the detent pin engages the recess 54a in ring 54 at which time the detent pin bottoms in the recess. This opens contacts 33LS1, de-energizing the creep motor and closes contacts 33LS2 which energize the servo clutch valve 30SV, engaging the clutch 21. At this point, if the servo is within its mechanical limits and if the spindle or servo clutch 21 is fully engaged, limit switches 43LS and 44LS are closed. Since contacts 36CR1 are now also closed, solenoid 36SVI is energized. Hydraulic motor 34 rotates in a direction to increase the radial position of the boring tool 2C. This operation is stopped at any point by opening the actuated switch S or R.

Whenever relay 36CR drops out the spindle pinning solenoid valve 32SV and the servo clutch solenoid 30SV are de-energized. These are spring retracted freeing the spindle. At the same time relay 36CR de-energizes the solenoid 36SVI of the directional valve 36SV and hydraulic motor 34 stops.

Relays 34CR, 35CR, 36CR, and 37CR may be provided with contacts 34CR5, 35CR2, 36CR3 and 37CR3, respectively, employed as interlocks in a starter circuit for the main motor M, shown only in block form and designated SC, which is completed by a starter switch SS. In this connection relay 35CR may be held energized by a limit switch 38LS shunting contacts 34CR1 in the circuit for the coil of relay 35CR. This limit switch may be closed by the extended spindle. Normally, contacts 34CR5, 36CR3 and 37CR3 may be shunted by contacts C1 which are closed after initial energization of the starter circuit.

For automatic operation discrete signals provided by any suitable discrete signal source 60, for example, a perforated tape reader, may be compared with the output of transducer head 46 in a conventional comparator circuit, represented by block 61, which maintains an electrical output as long as there is a difference in numerical significance between the signals being compared. Output circuits 62 may include control relays having contacts C3 and C4, respectively, in the circuits for relays 36CR and 37CR. The control signals produced by input signal source 60 indicate an increase or a decrease in bore diameter and in conjunction with a comparator output signal may selectively hold one of contacts C3 or C4 closed until the comparator output signal changes, or decreases to zero, indicating the programmed radial adjustment has been made. Opening of either contact C3 or C4, of course, stops radial adjustment as previously explained.

Although but one embodiment of this invention has been herein illustrated and described, it will be apparent to those skilled in the art that modifications as to certain aspects of the general organization of this invention and as to details of this invention may be made without departing from the spirit and scope thereof.

What is claimed is:
1. A machine tool comprising: a tool head; rotatable, coaxially disposed power and tool adjustment shafts; a tool head support adjacent one end of said power shaft, mounting said tool head on said power shaft for rotation therewith and for displacement radially of said power shaft; drive means connecting said adjustment shaft with said tool head to provide radial adjustment of said tool head upon rotation of said adjustment shaft relative to said power shaft; normally disengaged indexing means associated with said power shaft, operable to index said power shaft in a fixed angular position; a normally disengaged clutch having a driven member mounted on and adjacent to the other end of said adjustment shaft and having a rotatable and axially displaceable driving member, friction means frictionally engaging said adjustment shaft with said power shaft to cause rotation of said adjustment shaft with said power shaft when said clutch is disengaged; means connected to said driving member to axially displace said driving member into engagement with said driven member; and drive means connected to said driving member to drive said driving member.

2. A machine tool comprising: a radially adjustable and rotatable tool head; a rotatable power shaft connected at one end to said tool head to rotate said tool head; a tool adjusting shaft coaxially disposed of said power shaft; connections between one end of said tool adjusting shaft and said tool head for radially displacing said tool head by rotation of said tool adjusting shaft; means frictionally engaging said power shaft and said tool adjusting shaft to provide rotation of said tool adjusting shaft with said power shaft; normally disengaged indexing means operable to index said power shaft; a normally disengaged clutch having a driven clutch member connected to said tool adjusting shaft and having a cooperating driving clutch member displaceable from a disengaged position to a position engaging said clutch members; means connected with said driving clutch member to displace said driving clutch member to engaged position; and drive means connected to said driving clutch member.

3. A machine tool comprising: a rotatable power shaft; a radially adjustable tool head connected to said power shaft to be rotated thereby; a tool adjusting shaft coaxially disposed of said power shaft and having a connection with said tool head to radially displace said tool head upon rotation of said tool adjusting shaft relative to said power shaft; friction means connecting said power shaft and said tool adjusting shaft to rotate said tool adjusting shaft with said power shaft; indexing means releasably securing said power shaft in a fixed angular position for radial adjustment of said tool head; drive means for rotating said tool adjusting shaft; and a disengageable clutch connecting said drive means to said tool adjusting shaft, said drive means rotating said tool adjusting shaft against the frictional restraint of said friction means.

4. A machine tool comprising: a tool head; rotatable, coaxially disposed power and tool adjustment shafts; a tool head support adjacent one end of said power shaft, mounting said tool head on said power shaft for rotation therewith and for displacement radially of said power shaft; drive means connecting said adjustment shaft with said tool head to provide radial adjustment of said tool head upon rotation of said adjustment shaft relative to said power shaft; normally disengaged indexing means associated with said power shaft, operable to index said power shaft in a fixed angular position; a normally disengaged single position clutch having a driven member mounted on and adjacent to the other end of said adjustment shaft and having a rotatable and axially displaceable driving member, friction means frictionally engaging said adjustment shaft with said power shaft to cause rotation of said adjustment shaft with said power shaft when said clutch is disengaged; means connected to said driving member to axially displace said driving member into engagement with said driven member; and drive means connected to said driving member to drive said driving member.

5. A machine tool comprising: a radially adjustable and rotatable tool head; a rotatable power shaft connected at one end to said tool head to rotate said tool head; a tool adjusting shaft coaxially disposed of said power shaft; connections between one end of said tool adjusting shaft and said tool head for radially displacing said tool head by rotation of said tool adjusting shaft; means frictionally engaging said power shaft and said tool adjusting shaft to provide rotation of said tool adjusting shaft with said power shaft; normally disengaged indexing means operable to index said power shaft; a normally disengaged single position clutch having a driven clutch member connected to said tool adjusting shaft and having a cooperating driving clutch member displaceable from a disengaged position to a position engaging said clutch members; means connected with said driving clutch member to displace said driving clutch member to engaged position; and drive means connected to said driving clutch member.

6. A machine tool comprising: a rotatable power shaft; a radially adjustable tool head connected to said power shaft to be rotated thereby; a tool adjusting shaft coaxially disposed of said power shaft and having a connection with said tool head to radially displace said tool head upon rotation of said tool adjusting shaft relative to said power shaft; friction means connecting said power shaft and said tool adjusting shaft to rotate said tool adjusting shaft with said power shaft; indexing means releasably securing said power shaft in a fixed angular position for radial adjustment of said tool head; drive means for rotating said tool adjusting shaft; and a disengageable single position clutch connecting said drive means to said tool adjusting shaft; said drive means rotating said tool adjusting shaft against the frictional restraint of said friction means.

7. A machine tool comprising: a rotatable power shaft; a radially adjustable tool head connected to said power shaft to be rotated thereby; a tool adjusting shaft coaxially disposed of said power shaft and having a connection with said tool head to radially displace said tool head upon rotation of said tool adjusting shaft relative to said power shaft; friction means connecting said power shaft and said tool adjusting shaft to rotate said tool adjusting shaft with said power shaft; indexing means releasably securing said power shaft in a fixed angular position for radial adjustment of said tool head; drive means for rotating said tool adjusting shaft; a normally disengaged clutch having an output member connected to said tool adjusting shaft and having an input member connected to said drive means; normally inoperative clutch engaging means connected to one clutch member and operable to displace said one clutch member into engagement with the other; said drive means after engagement of said clutch rotating said tool adjusting shaft against the frictional restraint of said friction means; and control means connected to and sequentially operating, said indexing means, said clutch engaging means and said drive means.

8. A machine tool comprising: a rotatable power shaft; a radially adjustable tool head connected to said power shaft to be rotated thereby; a tool adjusting shaft coaxially disposed of said power shaft and having a connection with said tool head to radially displace said tool head upon rotation of said tool adjusting shaft relative to said power shaft; friction means connecting said power shaft and said tool adjusting shaft to rotate said tool adjusting shaft with said power shaft; indexing means releasably securing said power shaft in a fixed angular position for radial adjustment of said tool head; drive means for rotating said tool adjusting shaft; a normally disengaged single position clutch having an output member connected to said tool adjusting shaft and having an input member connected to said drive means; normally inoperative clutch engaging means connected to one clutch member and operable to displace said one clutch member into engagement with the other; said drive means after engagement of said clutch rotating said tool adjusting shaft against the frictional restraint of said friction means; and control means connected to and sequentially operating, said indexing means, said clutch engaging means and said drive means.

9. A boring tool control comprising: a boring tool having a boring tool spindle including a radially adjustable head; head adjusting means including an adjusting shaft coaxially disposed of said spindle, friction means frictionally engaging said adjusting shaft and said spindle; drive means; a disengageable clutch connecting said drive means and said adjusting shaft; said drive means driving said adjusting shaft against the frictional restraint of said friction means; spindle indexing means indexing said spindle in a fixed angular position; signal producing means producing a group of signals indicating a desired radial displacement of said head; an incremental position transducer responsive to radial displacement of said head and producing a group of signals indicative of the actual radial position of said head; comparator circuits receiving both of said groups of signals and producing an output signal when said signal groups are different and circuit means responsive to said output signal and having an output circuit connected to and controlling said drive means.

10. A boring tool control comprising: a boring tool having a boring tool spindle including a radially adjustable head; head adjusting means including an adjusting shaft coaxially disposed of said spindle, friction means frictionally engaging said adjusting shaft and said spindle; drive means; a disengageable single position clutch connecting said drive means and said adjusting shaft; said drive means driving said adjusting shaft against the frictional restraint of said friction means; spindle indexing means indexing said spindle in a fixed angular position; signal producing means producing a group of signals indicating a desired radial displacement of said head; an incremental position transducer responsive to radial displacement of said head and producing a group of signals indicative of the actual radial position of said head; comparator circuits receiving both of said groups of signals and producing an output signal when said signal groups are different and circuit means responsive to said output signal and having an output circuit connected to and controlling said drive means.

References Cited in the file of this patent

UNITED STATES PATENTS

| 2,486,977 | Peters | Nov. 1, 1949 |

FOREIGN PATENTS

| 11,650 | Great Britain | Oct. 20, 1910 |
| 437,042 | Italy | June 22, 1948 |
| 969,693 | France | May 31, 1950 |